(12) United States Patent
Ishibashi et al.

(10) Patent No.: US 9,722,239 B2
(45) Date of Patent: Aug. 1, 2017

(54) NEGATIVE ELECTRODE

(71) Applicant: KABUSHIKI KAISHA TOSHIBA, Minato-ku (JP)

(72) Inventors: Mitsuru Ishibashi, Yokohama (JP); Takuya Iwasaki, Uenohara (JP); Kazuhiro Yasuda, Yokohama (JP); Yorikazu Yoshida, Yokohama (JP); Hiroki Inagaki, Yokohama (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/200,660

(22) Filed: Mar. 7, 2014

(65) Prior Publication Data

US 2014/0295230 A1    Oct. 2, 2014

(30) Foreign Application Priority Data

Mar. 26, 2013   (JP) .................... 2013-063424

(51) Int. Cl.
*H01M 4/131*      (2010.01)
*H01M 10/0525*   (2010.01)
*H01M 4/485*     (2010.01)
*H01M 4/62*      (2006.01)
*H01M 4/02*      (2006.01)
*H01M 10/052*    (2010.01)

(52) U.S. Cl.
CPC .......... *H01M 4/131* (2013.01); *H01M 4/485* (2013.01); *H01M 4/622* (2013.01); *H01M 10/0525* (2013.01); *H01M 10/052* (2013.01); *H01M 2004/021* (2013.01)

(58) Field of Classification Search
CPC ...................................... H01M 4/131
See application file for complete search history.

(56) References Cited

U.S. PATENT DOCUMENTS

| | | | |
|---|---|---|---|
| 2009/0042100 A1* | 2/2009 | Tanaka ................ | H01M 4/13 429/217 |
| 2011/0159172 A1 | 6/2011 | Yamamoto | |
| 2012/0058395 A1 | 3/2012 | Harada et al. | |
| 2012/0129015 A1* | 5/2012 | Inagaki et al. ................ | 429/7 |

(Continued)

FOREIGN PATENT DOCUMENTS

| | | |
|---|---|---|
| CN | 1626603 A | 6/2005 |
| CN | 101364641 A | 2/2009 |
| CN | 102694176 A | 9/2012 |

(Continued)

OTHER PUBLICATIONS

JP2011-034962 MT.*

(Continued)

*Primary Examiner* — Alex Usyatinsky
(74) *Attorney, Agent, or Firm* — Oblon, McClelland, Maier & Neustadt, L.L.P.

(57) ABSTRACT

According to one embodiment, there is provided a negative electrode. The negative electrode includes a negative electrode layer. The negative electrode layer contains a titanium composite oxide and a carboxymethyl-cellulose compound. The carboxymethyl-cellulose has a degree of etherification of 1 or more and 2 or less. The negative electrode layer has a density of 2.2 g/cm$^3$ or more.

11 Claims, 5 Drawing Sheets

(56) References Cited

U.S. PATENT DOCUMENTS

2013/0071724 A1* 3/2013 Harada et al. .............. 429/163
2013/0216868 A1 8/2013 Inagaki et al.

FOREIGN PATENT DOCUMENTS

| | | |
|---|---|---|
| CN | 102742051 A | 10/2012 |
| CN | 102823029 A | 12/2012 |
| CN | 102956867 A | 3/2013 |
| JP | 2002-237305 A | 8/2002 |
| JP | 2011-34962 A | 2/2011 |
| JP | 2011-204576 | 10/2011 |
| JP | 2012-59467 | 3/2012 |
| JP | 2012-138350 | 7/2012 |
| JP | 2013-065440 * | 4/2013 |
| WO | WO 2012/029839 A1 | 3/2012 |

OTHER PUBLICATIONS

14158374,Decision EP,Feb. 4, 2016.*
201410092392,Notification to grant Chinese Patent Jun. 30, 2016.*
Decision of JPO to grant Patent for Application # Nov. 8, 2016 from Nov. 18, 2016.*
Extended European Search Report issued on Jul. 17, 2014, in European Patent Application No. 14158374.0.
Graham Armstrong, et al., "$TiO_2(B)$ Nanotubes as Negative Electrodes for Rechargeable Lithium Batteries", Electrochemical and Solid-State Letters, vol. 9, No. 3, 2006, pp. A139-A143.
Office Action issued Jul. 26, 2016, in Japanese Patent Application No. 2013-063424 filed Mar. 26, 2013 (with English translation).
Combined Chinese Office Action and Search Report issued Nov. 2, 2015 in Patent Application No. 201410092392.9 (with English language translation).

\* cited by examiner

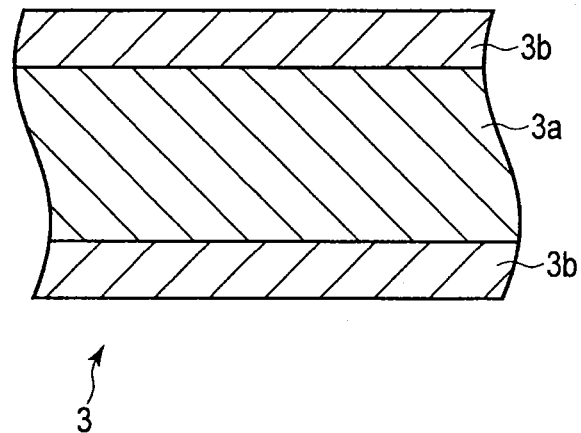
F I G. 1
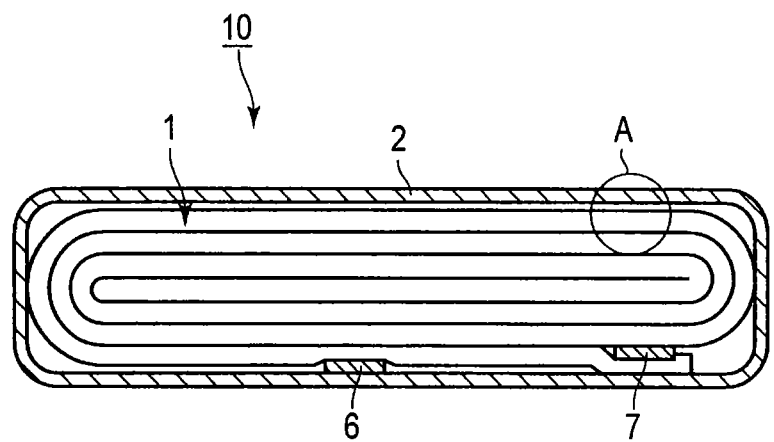
F I G. 2

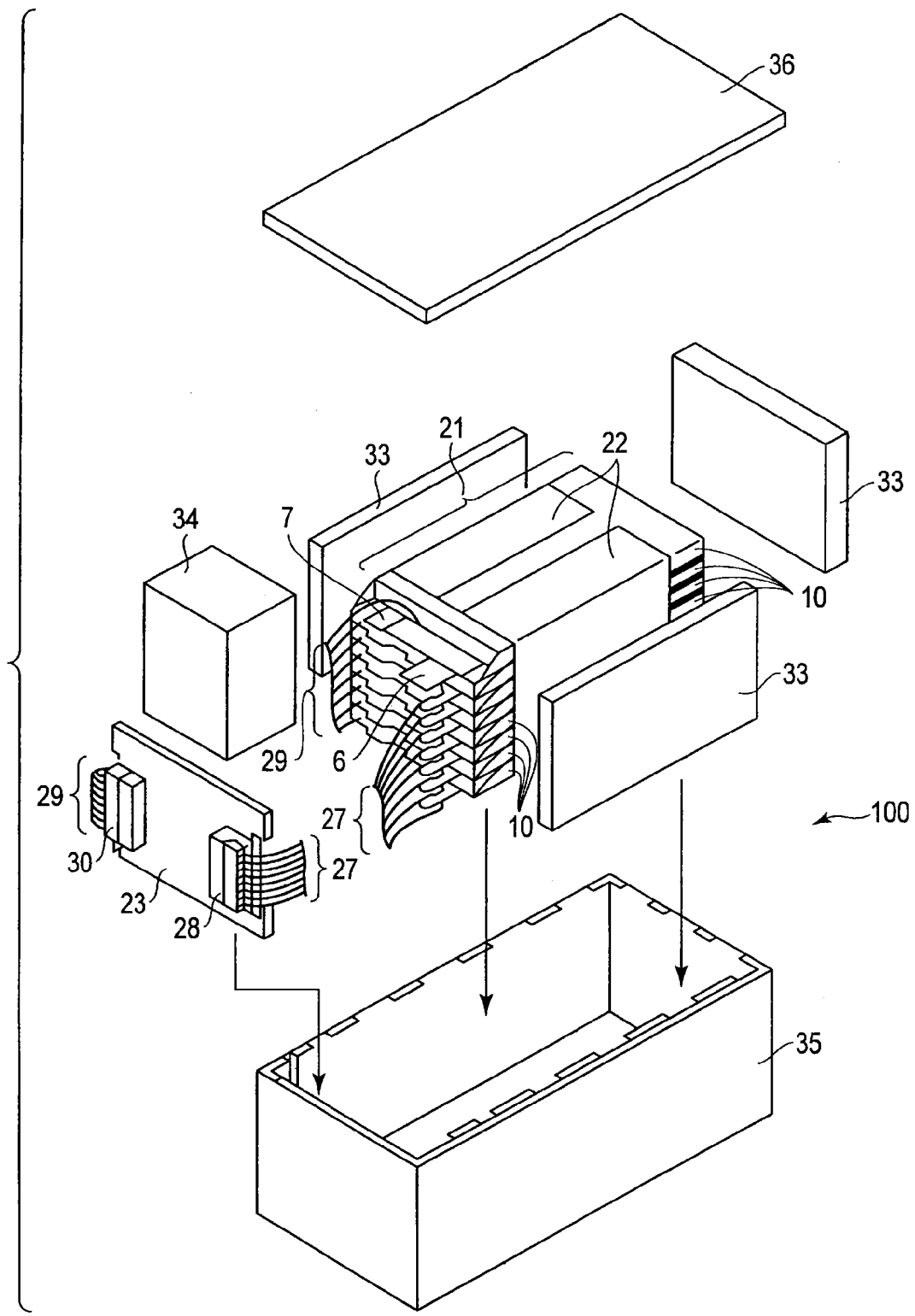
F I G. 4

NEGATIVE ELECTRODE

CROSS-REFERENCE TO RELATED APPLICATIONS

This application is based upon and claims the benefit of priority from Japanese Patent Application No. 2013-063424, filed Mar. 26, 2013; the entire contents of which are incorporated herein by reference.

FIELD

Embodiments described herein relate generally to a negative electrode, a nonaqueous electrolyte battery and a battery pack.

BACKGROUND

A titanium oxide having a monoclinic system β-type structure has recently attracted much attention as a high-capacity negative electrode material. The number of lithium ions which can be absorbed into/released from a lithium titanate having a spinel structure ($Li_4Ti_5O_{12}$), which has been made practicable, is three per unit chemical formula. For this reason, the number of lithium ions which can be absorbed/released is 3/5 per titanium ion, and the maximum value is theoretically 0.6. Such a lithium titanate having a spinel structure has a theoretical capacity of about 170 mAh/g.

On the contrary, the number of lithium ions which can be absorbed into/released from titanium oxide having a monoclinic system β-type structure is a maximum of 1.0 per titanium ion. This titanium oxide therefore provides a theoretical capacity as high as about 330 mAh/g and a reversible capacity as high as about 240 mAh/g. Consequently, development of high capacity batteries using titanium oxide having a monoclinic system β-type structure is expected.

However, when the titanium oxide having a monoclinic system β-type structure is independently used, adhesion between an electrode and a current collector is poor, which disadvantageously makes it difficult to raise the density of an electrode material layer.

BRIEF DESCRIPTION OF THE DRAWINGS

FIG. 1 is a schematic sectional view of a negative electrode of an example according to a first embodiment;

FIG. 2 is a schematic sectional view of a nonaqueous electrolyte battery of an example according to a second embodiment;

FIG. 4 is an exploded perspective view of a battery pack of an example according to a third embodiment;

DETAILED DESCRIPTION

Figure 3:
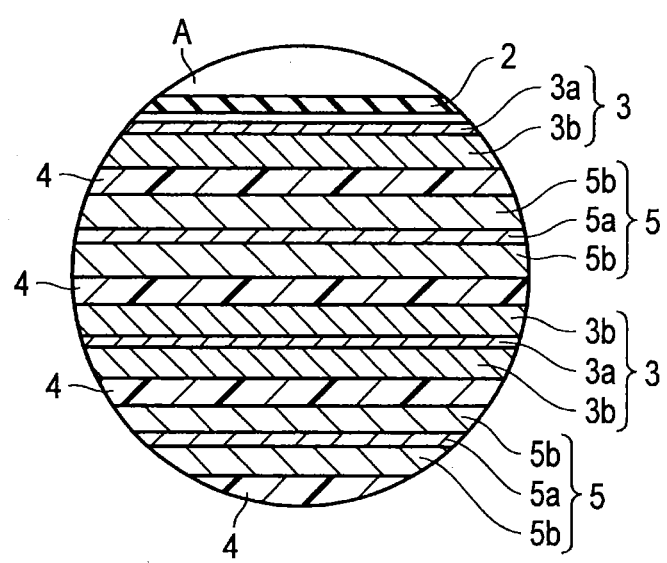
FIG. 3 is an enlarged sectional view of a portion A of FIG. 2.

According to one embodiment, there is provided a negative electrode. The negative electrode includes a negative electrode layer. The negative electrode layer contains a titanium composite oxide and a carboxymethyl-cellulose compound. The carboxymethyl-cellulose has a degree of etherification of 1 or more and 2 or less. The negative electrode layer has a density of 2.2 g/cm³ or more.

The embodiments will be explained below with reference to the drawings. In this case, the structures common to all embodiments are represented by the same symbols and duplicated explanations will be omitted. Also, each drawing is a typical view for explaining the embodiments and for promoting an understanding of the embodiments. Though there are parts different from an actual device in shape, dimension and ratio, these structural designs may be properly changed taking the following explanations and known technologies into consideration.

(First Embodiment)

According to a first embodiment, there is provided a negative electrode. The negative electrode includes a negative electrode layer. The negative electrode layer contains a titanium composite oxide and a carboxymethyl-cellulose compound. The carboxymethyl-cellulose has a degree of etherification of 1 or more and 2 or less. The negative electrode layer has a density of 2.2 g/cm³ or more.

It is necessary to raise the density of a negative electrode active material-containing layer, that is, a negative electrode layer in order to obtain a sufficient battery capacity when the titanium composite oxide is used for the negative electrode. However, when the density of the negative electrode layer is raised, the adhesion between the negative electrode layer and a negative electrode current collector is poor, which disadvantageously causes the peeling of the negative electrode layer. Specifically, when the negative electrode is excessively pressed in a manufacturing process to raise the density of the negative electrode layer, the adhesion between the negative electrode layer and the negative electrode current collector is deteriorated. As a result, the negative electrode layer is easily peeled from the negative electrode current collector. The titanium composite oxide, particularly a monoclinic system β-type titanium composite oxide, expands and contracts greatly during charge/discharge of a battery. Therefore, the volume of the negative electrode layer containing the monoclinic system β-type titanium composite oxide is largely changed by the charge/discharge of the battery. As a result, the peeling of the negative electrode layer from the negative electrode current collector is promoted. In the battery containing the electrode in which the peeling of the negative electrode layer from the negative electrode current collector is promoted, input/output characteristics are remarkably decreased. For the above reason, conventionally, the density of the negative electrode layer using the titanium composite oxide cannot be raised to 2.2 g/cm³ or more.

In the meantime, in the case of a negative electrode using carbon as a negative electrode active material, a water-soluble polymer having a degree of etherification of 0.8 or less may be used in order to raise the cohesive strength of the negative electrode. The water-soluble polymer having a degree of etherification of 0.8 or less is likely to form a network structure. Because of this, when the water-soluble polymer is mixed with carbon materials, the bindability between the carbon materials can be strengthened. Therefore, in the case of the negative electrode using the carbon as the negative electrode active material, a water-soluble polymer having a degree of etherification of 0.8 or less is usually used.

A carbon electrode having a density of 2.0 g/cm³ or less is usually used as a conventional carbon electrode.

In the meantime, the negative electrode according to the first embodiment contains the negative electrode layer having a density of 2.2 g/cm³ or more.

The negative electrode containing the negative electrode layer having a density of 2.2 g/cm³ or more can secure a sufficient energy density. Since the negative electrode containing the negative electrode layer having a density 2.2 g/cm³ or more can decrease internal resistance, the battery including the negative electrode can exhibit excellent input/output characteristics and excellent cycle life.

Although the density of the negative electrode layer can be further raised to improve a capacity, the impregnating ability of an electrolytic solution is decreased when the density is excessively high. Therefore, in order to realize a nonaqueous electrolyte battery capable of improving the impregnating ability of the electrolytic solution, and furthermore capable of exhibiting excellent cycle life and excellent input/output characteristics, the density is preferably 3.0 g/cm³ or less. The density of the negative electrode layer is more preferably 2.5 g/cm³ or less.

The negative electrode according to the first embodiment contains the negative electrode layer containing the titanium composite oxide and the carboxymethyl-cellulose compound having a degree of etherification of 1 or more and 2 or less. Because of this, in the negative electrode according to the first embodiment, the negative electrode layer can have a density of 2.2 g/cm³ or more even in a low press pressure. The reason for this will be explained in detail below.

The carboxymethyl-cellulose (CMC) compound can function as a water-soluble binder.

The carboxymethyl-cellulose is obtained by substituting a carboxymethyl group on an OH group of a cellulose skeleton. The properties of carboxymethyl-cellulose differ according to the degree of substitution. The substitution amount per unit skeleton is referred to as the degree of etherification. Since the carboxymethyl-cellulose has three OH groups, the maximum degree of etherification is 3.

The lower degree of etherification the carboxymethyl-cellulose has the easier pseudocrosslinking of molecules of the carboxymethyl-cellulose causes, resulting in the forming of a network structure. This is because entanglement of the molecules is caused by pseudocrosslinking of unsubstituted cellulose portions to develop thixotropy (rocking characteristic) and other properties when the degree of etherification is low.

Since there is less crosslinking of the carboxymethyl-cellulose molecules in the carboxymethyl-cellulose compound containing a cellulose portion having a degree of etherification of 1 or more, the carboxymethyl-cellulose compound can exhibit excellent flexibility. Therefore, the negative electrode layer containing the carboxymethyl-cellulose compound having a degree of etherification of 1 or more enables the pressure required to obtain a high density to be reduced, which can thus prevent cracks during pressing. Because of this low press pressure, in the negative electrode according to the first embodiment, the negative electrode layer can have a density of 2.2 g/cm³ or more without causing cracks and peeling.

When the degree of etherification of the carboxymethyl-cellulose compound is more than 2, the carboxymethyl-cellulose compound has a low viscosity, and a slurry suitable for manufacturing an electrode cannot be manufactured. The carboxymethyl-cellulose compound having an excessively high degree of etherification causes a cost increase, which is not preferable. The carboxymethyl-cellulose compound having a degree of etherification of less than 1 does not provide sufficient electrode flexibility, which makes it difficult to raise the density of the negative electrode layer. For this reason, when the carboxymethyl-cellulose compound having a degree of etherification of less than 1 is used, it is difficult to obtain a negative electrode containing a negative electrode layer having a density of 2.2 g/cm³ or more.

The carboxymethyl-cellulose compound has high bindability between the carboxymethyl-cellulose compound and the titanium composite oxide, irrespective of the degree of etherification.

Thus, since the negative electrode according to the first embodiment contains the carboxymethyl-cellulose compound having a degree of etherification of 1 or more and 2 or less, an excessive pressure press is not required in order to raise the density of the negative electrode layer. Furthermore, the negative electrode according to the first embodiment has high bindability between the carboxymethyl-cellulose compound and the titanium composite oxide contained in the negative electrode layer. Because of this, the negative electrode according to the first embodiment can prevent the peeling of the negative electrode layer, and can exhibit high cohesive strength. Because of these, the battery including the negative electrode according to the first embodiment can prevent the deterioration of the negative electrode even if charge and discharge are repeated.

The negative electrode according to the first embodiment, particularly the negative electrode including the negative electrode layer having a density of 2.2 g/cm³ or more can be produced in a comparatively low linear pressure in a roll press process presently used.

Thus, since the negative electrode according to the first embodiment can be produced in a comparatively low linear pressure using a currently running roll press machine, the negative electrode can reduce new equipment investment, and can exhibit excellent cycle life.

The negative electrode layer containing the carboxymethyl-cellulose having a degree of etherification of 1 or more and 2 or less as the water-soluble binder further exhibits effects in addition to the previously described effects. Examples of the effects include an improvement in coatability of a slurry due to a reduction in thixotropy, an improvement in coatability of a slurry due to a reduction in a gel-like undissolved solid, an improvement in acid resistance and alkali resistance, an increase in a solid content concentration (NV) due to a reduction in a viscosity, and an improvement in adhesion.

Next, a method for measuring the degree of etherification of the carboxymethyl-cellulose compound will be described.

The degree of etherification of the carboxymethyl-cellulose compound can be measured using an incineration measuring method to be described below, for example. First, about 0.7 g of a sample (anhydride) is accurately weighted, wrapped in a filter paper, and placed in a magnetic crucible. The sample is sufficiently subjected to incineration at 600° C. After cooling, the sample is moved to a 500 ml volume beaker. About 250 ml of water and 35 ml of 0.05 mol/l sulfuric acid are added thereto, and the mixture is boiled for 30 minutes. After cooling thereof, a phenolphthalein indicator is added thereto, and excess acid is subjected to back titration by 0.1 mol/l potassium hydroxide. The degree of etherification of the carboxymethyl-cellulose compound can be calculated by introducing the result into the following formula:

$$\text{Degree of etherification} = 162 \times A / (10000 - 80 \times A)$$

(A is the number of ml of 0.05 mol/l sulfuric acid consumed by binding alkali in 1 g of the sample.)

For example, the degree of etherification of the carboxymethyl-cellulose compound contained in the negative electrode can be measured as follows. First, an extracted material is obtained from the negative electrode by extracting the carboxymethyl-cellulose compound into water. Then, the extracted material is subjected to the above incineration measuring method. The carboxymethyl-cellulose compound can be extracted at any temperature of a high temperature, a room temperature, and a low temperature as extraction conditions. However, the carboxymethyl-cellulose compound is preferably extracted for about 1 to 5 hours at 50 to 80° C. The obtained extracted material is filtered, and the filtered product is then dried to use the product as an analysis sample. The solid content can be separated using methods such as centrifugal separation besides filtration. The drying is preferably vacuum drying performed at 50 to 80° C.

The degree of etherification of the carboxymethyl-cellulose compound contained in the negative electrode included in the nonaqueous electrolyte battery can be measured by the following method, for example. First, the nonaqueous electrolyte battery is disintegrated under an argon environment (in a glove box), to eject the electrode. Then, the ejected electrode is washed in acetone. Then, CMC is extracted from the electrode into water in the same method as the previously described method to produce the sample. The degree of etherification of the carboxymethyl-cellulose compound contained in the negative electrode included in the nonaqueous electrolyte battery can be measured by using the previously described incineration measuring method for the sample.

Next, an example of the negative electrode according to the first embodiment will be described.

The negative electrode of this example includes a negative electrode current collector and a negative electrode layer formed on the negative electrode current collector.

The negative electrode layer may be formed on both or one of surfaces of the negative electrode current collector. The negative electrode current collector can contain a surface having a portion on which the negative electrode layer is not formed. The portion can function as a current collecting tab of the negative electrode.

The negative electrode layer contains a titanium composite oxide and a carboxymethyl-cellulose compound.

The titanium composite oxide can function as a negative electrode active material. The negative electrode layer can also contain a further negative electrode active material.

The carboxymethyl-cellulose compound can function as a water-soluble binder. The negative electrode layer can also contain a further binder other than the carboxymethyl-cellulose compound. The binder containing the water-soluble binder can be used in order to improve the bindability between the negative electrode current collector and the negative electrode active material.

The negative electrode layer can further contain a conductive agent. The conductive agent can be used in order to improve the current collecting performance of the negative electrode active material, and in order to suppress the contact resistance between the negative electrode layer and the negative electrode current collector. When the negative electrode layer contains the conductive agent, the binder can act to bind the negative electrode active material and the conductive agent with each other.

The formulating ratios of the negative electrode active material, the conductive agent, and the binder in the active material layer are preferably in the ranges of 85% by mass or more and 97% by mass or less, 2% by mass or more and 20% by mass or less, and 2% by mass or more and 16% by mass or less, respectively. When the active material layer contains 2% by mass or more of the conductive agent, the current collecting performance of the negative electrode layer can be improved, and the large-current characteristics of the nonaqueous electrolyte battery can be improved. When the active material layer contains 2% by mass or more of the binder, the bindability between the negative electrode layer and the negative electrode current collector can be improved to provide an excellent cycle characteristic. In the meantime, from the viewpoint of an increase in a capacity, the contents of the conductive agent and the binder are preferably 20% by mass or less and 16% by mass or less, respectively.

Next, materials capable of being used in the negative electrode according to the first embodiment will be described more in detail.

(1) Titanium Composite Oxide

The titanium composite oxide preferably contains a monoclinic system β-type titanium composite oxide. The titanium composite oxide more preferably contains the monoclinic system β-type titanium composite oxide of 80% by weight or more based on the amount of the titanium composite oxide.

Herein, the monoclinic system β-type titanium composite oxide means a titanium composite oxide having the crystal structure of monoclinic system titanium dioxide. The crystal structure of the monoclinic system titanium dioxide mainly belongs to a space group C2/m, showing a tunnel structure. The detailed crystal structure of the monoclinic system titanium dioxide is described in G. Armstrong, A. R. Armstrong, J. Canales, P. G. Bruce, Electrochem. Solid-State Lett., 9, A139 (2006).

In the monoclinic system β-type titanium composite oxide, the maximum number of lithium ions which can be absorbed and released per titanium ion is 1.0. Therefore, the monoclinic system β-type titanium composite oxide can have a high theoretical capacity.

Accordingly, the negative electrode according to the first embodiment containing the negative electrode layer containing the monoclinic system β-type titanium composite oxide can realize the nonaqueous electrolyte battery having a higher energy density.

Furthermore, since the carboxymethyl-cellulose contained in the negative electrode layer of the negative electrode according to the first embodiment has high flexibility, the bindability between the titanium composite oxide containing the monoclinic system β-type titanium composite oxide can be kept even if the volume of the monoclinic system β-type titanium composite oxide is changed during charge/discharge, to suppress the peeling of the negative electrode layer from the negative electrode current collector.

Accordingly, the negative electrode according to the first embodiment containing the negative electrode layer containing the monoclinic system β-type titanium composite oxide can realize the nonaqueous electrolyte battery capable of exhibiting a more excellent cycle life.

The average secondary particle diameter of the particles of the monoclinic system β-type titanium composite oxide is preferably in the range of 5 μm to 20 μm. When the average secondary particle diameter is 5 μm or more, the discharge capacity can be further improved. When the secondary particle diameter is 20 μm or less, the discharge capacity can be improved while a sufficient density is kept. The secondary particle diameter can be measured by laser diffraction particle size distribution measurement, for example.

The specific surface area of the particles of the monoclinic system β-type titanium composite oxide is preferably 5 m$^2$/g or more and 50 m$^2$/q or less.

When the specific surface area is 5 m$^2$/g or more, lithium-ion absorption/release sites can be sufficiently secured, so that a high capacity can be obtained.

When the specific surface area is 50 m$^2$/g or less, the adhesion of a by-product generated by the decomposition of the nonaqueous electrolyte during charge/discharge to the surface of the negative electrode layer can be suppressed. As a result, the nonaqueous electrolyte battery including the negative electrode can suppress deterioration in coulomb efficiency during charge/discharge.

The specific surface area of the particles of the monoclinic β-type titanium composite oxide is more preferably 10 m$^2$/g or more and 20 m$^2$/g or less.

The specific surface area of the particles can be measured by the BET adsorption method by N$_2$ adsorption, for example.

The monoclinic system β-type titanium composite oxide may be synthesized in the following manner, for example. First, alkali titanate compounds such as Na$_2$Ti$_3$O$_7$, K$_2$Ti$_4$O$_9$, and Cs$_2$Ti$_5$O$_{11}$ are subjected to a proton-exchange process to obtain a proton-exchanged compound in which the alkali metal was replaced with a proton. Then, the proton-exchanged compound is heat-treated. Thereby, a monoclinic system β-type titanium composite oxide can be obtained. The obtained monoclinic system β-type titanium composite oxide may contain an alkali metal like Na, K, and Cs left unremoved after the proton-exchange process. However, the content of these alkali metals is preferably small. The content of the alkali metals is preferably 2% by mass or less, and more preferably 1% by mass or less based on the mass of the monoclinic system β-type titanium composite oxide.

The titanium composite oxide can also contain a lithium titanate having a spinel structure. The lithium titanate having a spinel structure can be represented by, for example, Li$_{4+x}$Ti$_5$O$_{12}$ (x varies within a range of −1≤x≤3 according to a charge/discharge reaction).

The content of the spinel type lithium titanate is preferably 20% by weight or less based on the amount of the negative electrode active material.

The average secondary particle diameter of the particles of the lithium titanate having a spinel structure is preferably in the range of 0.3 μm to 3 μm. When the average secondary particle diameter is 0.3 μm or more, the handling in industrial production can be simplified. When the average secondary particle diameter is 3 μm or less, a sufficient density is kept, and the discharge capacity can be improved.

The specific surface area of the lithium titanate having a spinel structure is preferably 2 m$^2$/g or more and 20 m$^2$/g or less. When the specific surface area is 2 m$^2$/g or more, lithium-ion absorption/release sites can be sufficiently secured, so that a high capacity can be obtained. When the specific surface area is 20 m$^2$/g or less, deterioration in coulomb efficiency during charge/discharge can be suppressed. The specific surface area is more preferably 3 m$^2$/g or more and 10 m$^2$/g or less.

The titanium composite oxide can also contain a ramsdellite-type lithium titanate. The content of the ramsdellite-type lithium titanate is preferably 5% by weight or less based on the amount of the negative electrode active material.

(2) Binder

A sodium salt, an ammonium salt, and an acid type CMC or the like can be used as the carboxymethyl-cellulose compound capable of functioning as the water-soluble binder. The sodium salt of the carboxymethyl-cellulose is preferably used from the aspects of solubility and electrode performance.

The content of the carboxymethyl-cellulose compound is preferably in the range of 1% by mass to 8% by mass based on the titanium composite oxide. When the content is 1% by mass or more, the surface of particle can be coated while the viscosity of the negative electrode slurry can be stably increased. In the meantime, when the content is 8% by mass or less, the reduction in electron conductivity and ion conductivity caused by the excess amount of the carboxymethyl-cellulose compound to be coated can be prevented. The viscosity of the carboxymethyl-cellulose compound is not particularly limited as long as the use concentration can be adjusted. However, the viscosity in 1% by mass at 25° C. is preferably in the range of 100 mPa·sec to 10000 mPa·sec. Furthermore, the viscosity of the carboxymethyl-cellulose compound is more preferably in the range of 1000 mPa·sec to 5000 mPa·sec when the concentration of the slurry is adjusted so that a solid content rate can be designed to be 50% or more in the case where the slurry is produced.

The carboxymethyl-cellulose can be mixed a further binder such as polytetrafluoroethylene (PTFE), polyvinylidene fluoride (PVDF), fluorine rubber, and styrene-butadiene copolymer rubber (SBR).

When the binder contains binders other than the carboxymethyl-cellulose compound, the weight of the carboxymethyl-cellulose compound is preferably ⅓ to ½ based on the weight of the binder.

The negative electrode according to the first embodiment more preferably contains the styrene-butadiene copolymer rubber as the binder. The styrene-butadiene copolymer rubber has higher flexibility than that of the polyvinylidene fluoride (PVDF) or the like, for example. Therefore, when the negative electrode layer of the negative electrode according to the first embodiment contains the monoclinic system β-type titanium composite oxide, the styrene-butadiene copolymer rubber can raise the density of the negative electrode layer without any biased orientation of the particles of the monoclinic system β-type titanium composite oxide. The styrene-butadiene copolymer rubber can further improve the bindability of the negative electrode by virtue of the synergistic effect with the carboxymethyl-cellulose compound.

When the negative electrode layer of the negative electrode according to the first embodiment contains the styrene-butadiene copolymer rubber, the content thereof is preferably 1% by mass to 8% by mass based on the titanium composite oxide. When the content of the styrene-butadiene copolymer rubber is 1% by mass or more, the adhesion between the negative electrode layer and the negative electrode current collector can be secured. Because of this, a more excellent cycle characteristic can be obtained. In the meantime, when the content of the styrene-butadiene copolymer rubber is 8% by mass or less, the fluidity of the electrode slurry can be secured while electron conductivity and ion conductivity are kept. Because of this, the coatability of the electrode slurry can be improved.

(3) Conductive Agent

Examples of the conductive agent include acetylene black, carbon black, and graphite. The graphite has a plate shape and is slippery. Therefore, when the negative electrode layer of the negative electrode according to the first embodiment contains the particles of the monoclinic system β-type titanium composite oxide, the graphite can raise the density of the negative electrode layer without any biased orientation of the particles of the monoclinic system β-type titanium composite oxide. In this case, preferably, the acetylene black is further used in order to obtain a sufficient life cycle characteristic.

(4) Negative Electrode Current Collector

The negative electrode current collector can be made of a metal foil. Typically, the negative electrode current collector can be made of an aluminum foil or an aluminum alloy foil containing elements such as Mg, Ti, Zn, Mn, Fe, Cu, and Si.

The negative electrode according to the first embodiment can be produced by the following method, for example.

First, a negative electrode active material, a conductive agent, and a binder are suspended in a widely used solvent, for example, N-methylpyrrolidone (NMP) to prepare a slurry. A negative electrode active material containing a titanate composite oxide is used as the negative electrode active material. A binder containing a carboxymethyl-cellulose compound having a degree of etherification of 1 or more and 2 or less is used as the binder.

The slurry is applied to one or both of surfaces of the negative electrode current collector, followed by drying. A linear pressure of 7 to 18 kN (per 2 cm) is then applied to the negative electrode current collector by a currently running roll press machine, and thereby the negative electrode according to the first embodiment having a negative electrode layer having a density of 2.2 g/cm$^3$ or more can be produced.

Next, a negative electrode of an example according to the first embodiment will be described more in detail with reference to the drawings.

FIG. 1 is a schematic sectional view of the negative electrode of an example according to the first embodiment.

The negative electrode 3 shown in FIG. 1 contains a negative electrode current collector 3a and a negative electrode layer 3b formed on each side of the negative electrode current collector 3a.

The negative electrode layer 3b contains a negative electrode active material containing a titanate composite oxide, a carboxymethyl-cellulose compound as an aqueous binder, and a conductive agent. The carboxymethyl-cellulose compound has a degree of etherification of 1 or more and 2 or less.

According to the first embodiment described above, the negative electrode is provided. The negative electrode contains the negative electrode layer. The negative electrode layer contains a titanium composite oxide and a carboxymethyl-cellulose compound. The carboxymethyl-cellulose compound has a degree of etherification of 1 or more and 2 or less. The negative electrode layer has a density of 2.2 g/cm$^3$ or more.

The negative electrode contains the negative electrode layer containing the titanium composite oxide and the carboxymethyl-cellulose compound having a degree of etherification of 1 or more and 2 or less. Because of this, the negative electrode layer can have a density of 2.2 g/cm$^3$ or more without causing cracks and peeling, due to the low press pressure. The negative electrode can exhibit a high cohesive strength, and can reduce internal resistance. Consequently, the negative electrode according to the first embodiment can realize the nonaqueous electrolyte battery capable of exhibiting an excellent cycle life.

(Second Embodiment) electrode can realize the nonaqueous electrolyte battery

According to a second embodiment, there is provided a nonaqueous electrolyte battery. The nonaqueous electrolyte battery includes the negative electrode according to the first embodiment, a positive electrode, and nonaqueous electrolyte.

The negative electrode according to the first embodiment is a negative electrode which can realize a nonaqueous electrolyte battery capable of exhibiting an excellent cycle life as described in the description of the first embodiment. Consequently, a nonaqueous electrolyte battery according to the second embodiment can exhibit an excellent cycle life.

Next, an example of the nonaqueous electrolyte battery according to the second embodiment will be described.

The nonaqueous electrolyte battery of this example includes the negative electrode according to the first embodiment, a positive electrode, and a separator interposed between the negative electrode and the positive electrode.

The positive electrode contains a positive electrode current collector and a positive electrode layer formed on the positive electrode current collector.

The positive electrode layer may be formed on both or one of surfaces of the positive electrode current collector. The positive electrode current collector can have a surface containing a portion on which the positive electrode layer is not formed. The portion can function as a current collecting tab of the positive electrode.

The positive electrode layer contains a positive electrode active material. The positive electrode layer can further contain a conductive agent and a binder. The conductive agent can be used in order to improve the current collecting performance of the positive electrode active material, and in order to suppress the contact resistance between the positive electrode layer and the positive electrode current collector. The binder can be used in order to improve the bindability between the positive electrode current collector and the positive electrode active material.

The formulating ratios of the positive electrode active material, the conductive agent, and the binder in the positive electrode layer are preferably in the ranges of 80% by mass or more and 95% by mass or less, 3% by mass or more and 18% by mass or less, and 2% by mass or more and 17% by mass or less, respectively. When the amount of the conductive agent is 3% by mass or more, the above effect can be exerted. When the ratio of the conductive agent is 18% by mass or less, the decomposition of the nonaqueous electrolyte on the surface of the conductive agent when the battery is stored at high temperatures can be reduced. When the amount of the binder is 2% by mass or more, sufficient positive electrode strength is obtained. When the amount of the binder is 17% by mass or less, the formulating amount of the binder which is an insulating material in the positive electrode layer can be reduced, making it possible to reduce the internal resistance.

The negative electrode, the positive electrode, and the separator constitute an electrode group. The electrode group may have a stack type structure, or may have a wound type structure. The stack type structure has a structure where a plurality of negative electrodes, a plurality of positive electrodes, and separators are laminated with each of the separators sandwiched between each of the negative electrodes and each of the positive electrodes, for example. The electrode group having the wound type structure may be a can type structure obtained by winding a product obtained by laminating a negative electrode and a positive electrode with separators sandwiched therebetween, for example, or may be a flat type structure obtained by pressing the can type structure.

The nonaqueous electrolyte battery of this example includes a nonaqueous electrolyte impregnated in the electrode group.

The nonaqueous electrolyte battery of this example includes a container storing the electrode group and the nonaqueous electrolyte therein. The container includes a positive electrode terminal and a negative electrode terminal. The positive electrode terminal can be electrically connected to the current collecting tab of the positive electrode of the electrode group. The negative electrode terminal can be electrically connected to a current collecting tab of the negative electrode of the electrode group.

Hereinafter, members capable of being included in the nonaqueous electrolyte battery according to the second embodiment will be described.

(1) Positive Electrode (A) Positive Electrode Active Material

As the positive electrode active material, various oxides, sulfides, and polymers may be used.

Examples of the oxides include those into which lithium ions can be absorbed; for example, manganese dioxide ($MnO_2$), iron oxide, copper oxide, nickel oxide, lithium-manganese composite oxides (for example, $Li_xMn_2O_4$ or $Li_xMnO_2$), lithium-nickel composite oxides (for example, $Li_xNiO_2$), lithium-cobalt composite oxides (for example, $Li_xCoO_2$), lithium-nickel-cobalt composite oxides (for example, $LiNi_{1-y}Co_yO_2$), lithium-manganese-cobalt composite oxides (for example, $Li_xMn_yCo_{1-y}O_2$), lithium-nickel-cobalt-manganese composite oxides (for example, $LiNi_{1-y-z}Co_yMn_zO_2$), lithium-nickel-cobalt-aluminum composite oxides (for example, $LiNi_{1-y-z}Co_yAl_zO_2$), lithium-manganese-nickel composite oxides having a spinel structure (for example, $Li_xMn_{2-y}Ni_yO_4$), lithium-phosphorous oxides having an olivine structure (for example, $Li_xFePO_4$, $Li_xFe_{1-y}Mn_yPO_4$, and $Li_xCoPO_4$), iron sulfate ($Fe_2(SO_4)_3$), and vanadium oxide (for example, $V_2O_5$). In the above formula, $0<x\leq 1$, $0\leq y\leq 1$, and $0\leq z\leq 1$ are preferred. As the active material, these compounds may be used alone or in combination with a plurality of compounds.

Organic materials and inorganic materials, for example, conductive polymer materials such as a polyaniline or polypyrrole, disulfide-based polymer materials, sulfur (S), and fluorocarbon may be used as the positive electrode active material.

As the positive electrode active material, the above compounds may be used either singly or in combination of two or more.

An active material which provides a high positive electrode voltage is more preferable, and examples of the active material include lithium-manganese composite oxides (for example, $Li_xMn_2O_4$), lithium-manganese-nickel composite oxides having a spinel structure (for example, $Li_xMn_{2-y}Ni_yO_4$), lithium-nickel composite oxides (for example, $Li_xNiO_2$), lithium-cobalt composite oxides (for example, $Li_xCoO_2$), lithium-nickel-cobalt composite oxides (for example, $Li_xNi_{1-y}Co_yO_2$), lithium-manganese-cobalt composite oxides (for example, $Li_xMn_yCo_{1-y}O_2$), lithium-nickel-cobalt-manganese composite oxides (for example, $LiNi_{1-y-z}Co_yMn_zO_2$) and lithium-iron phosphate (for example, $LixFePO_4$). In the above formula, $0<x\leq 1$, $0\leq y\leq 1$, and $0\leq z\leq 1$ are preferred.

(B) Conductive Agent

Examples of the conductive agent include carbonaceous materials such as acetylene black, carbon black, graphite, carbon nano-fiber, and carbon nanotubes.

(C) Binder

Examples of the binder include a polytetrafluoroethylene (PTFE), polyvinylidene fluoride (PVDF), and fluoro rubber.

(D) Positive Electrode Current Collector

The positive electrode current collector is preferably made of an aluminum foil or aluminum alloy foil containing at least one element selected from Mg, Ti, Zn, Mn, Fe, Cu, and Si.

(E) Manufacturing Method

The positive electrode can be produced by the following method, for example. First, a positive electrode active material, a conductive agent, and a binder are suspended in a solvent to prepare a slurry. This slurry is applied to one or both surfaces of a positive electrode current collector and dried to form a positive electrode layer. Then, the positive electrode layer is subjected to pressing. Alternatively, the positive electrode active material, the conductive agent, and the binder are made into a pellet, which may be used as a positive electrode layer.

(2) Separator

As the separator, a porous film made of materials such as polyethylene, polypropylene, cellulose, and polyvinylidene fluoride (PVDF), a synthetic resin nonwoven fabric or the like can be used. Particularly, a porous film made of polyethylene or polypropylene melts at a constant temperature and can block electric current, and thus it is preferred from the viewpoint of improvement in safety.

(3) Nonaqueous Electrolyte

As the nonaqueous electrolyte, a liquid nonaqueous electrolyte or gel-like nonaqueous electrolyte can be used. The liquid nonaqueous electrolyte is prepared by dissolving an electrolyte in an organic solvent. The concentration of the electrolyte is preferably in the range of 0.5 to 2.5 mol/l. The gel-like nonaqueous electrolyte is prepared by forming a composite of a liquid electrolyte and a polymer material.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and bistrifluoromethylsulfonylimide lithium [$LiN(CF_3SO_2)_2$]. These electrolytes may be used either singly or in combination of two or more. The electrolyte preferably contains $LiN(CF_3SO_2)_2$.

Examples of the organic solvent include cyclic carbonates such as propylene carbonate (PC), ethylene carbonate (EC), and vinylene carbonate; chain carbonates such as diethyl carbonate (DEC), dimethyl carbonate (DMC) and methylethyl carbonate (NEC); cyclic ethers such as tetrahydrofuran (THF), 2-methyltetrahydrofuran (2MeTHF) and dioxolan (DOX); chain ethers such as dimethoxyethane (DME) and diethoxyethane (DEE); and g-butyrolactone (GBL), acetonitrile (AN), and sulfolane (SL). These organic solvents may be used either singly or in combination of two or more.

More preferable examples of the organic solvent include mixture solvents obtained by mixing two or more selected from the group consisting of propylene carbonate (PC), ethylene carbonate (EC), diethyl carbonate (DEC), dimethyl carbonate (DMC) and methylethyl carbonate (MEC), and mixture solvents containing γ-butyrolactone (GBL). A nonaqueous electrolyte battery superior in low-temperature performance can be obtained by using such a mixture solvent.

Examples of the polymer material include a polyvinylidene fluoride (PVDF), polyacrylonitrile (PAN), and polyethylene oxide (PEO).

(4) Container

A baggy container formed of a laminate film or a metal container is used as the container.

The shape is not particularly limited. Various shapes can be used according to the application of the nonaqueous electrolyte battery according to the second embodiment. Examples of the shape of the container include a flat type, angular type, cylinder type, coin type, button type, sheet type, and lamination type shapes. Of course, the nonaqueous electrolyte battery according to the second embodiment may be used for small-sized batteries to be mounted on portable electronic devices or the like and large-sized batteries to be mounted on two- to four-wheel vehicles or the like.

As the laminate film, a multilayer film in which a metal layer is sandwiched between resin layers is used. The metal layer is preferably aluminum foil or aluminum alloy foil in order to reduce the weight. Polymer materials such as polypropylene (PP), polyethylene (PE), nylon, and polyethylene terephthalate (PET) can be used for the resin film. The laminate film can be formed into a shape of the exterior member by heat sealing. The thickness of the laminate film is preferably 0.2 mm or less.

The metal container may be made of aluminum or an aluminum alloy, for example. The aluminum alloy preferably contains elements such as Mg, Zn, and Si. In the meantime, the amount of the transition metals such as Fe, Cu, Ni, and Cr is preferably 1% by mass or less. Thus, the long-term reliability in a hot environment can be obtained, and the heat releasing property can be dramatically improved. The metal container preferably has a thickness of 0.5 mm or less, and more preferably 0.2 mm or less.

(5) Positive Electrode Terminal

The positive electrode terminal is made of, for example, a material having electric stability and conductivity in a potential range of 3.0 V or more and 4.5 V or less to Li/Li$^+$. The positive electrode terminal is preferably formed of aluminum or an aluminum alloy containing elements such as Mg, Ti, Zn, Mn, Fe, Cu, and Si. The positive electrode terminal is preferably formed of the same material as that of the positive electrode current collector in order to reduce the contact resistance with the positive electrode current collector.

(6) Negative Electrode Terminal

A negative electrode terminal is made of, for example, a material having electric stability and conductivity in a potential range of 1.0 V or more and 3.0 V or less to Li/Li$^+$. The negative electrode terminal preferably formed of aluminum or an aluminum alloy containing elements such as Mg, Ti, Zn, Mn, Fe, Cu, and Si. It is preferable that the negative electrode terminal is formed of a material similar to that of the negative electrode current collector in order to reduce the contact resistance with the negative electrode current collector.

Next, a nonaqueous electrolyte battery as an example according to the second embodiment will be described more in detail with reference to the drawings.

FIG. 2 is a schematic sectional view of the nonaqueous electrolyte battery as an example according to the second embodiment. FIG. 3 is an enlarged sectional view of a portion A of FIG. 2.

A nonaqueous electrolyte battery 10 shown in FIGS. 2 and 3 is a flat type nonaqueous electrolyte battery.

The battery 10 includes a flat-shaped electrode group 1, a nonaqueous electrolyte (not shown) impregnated in the electrode group 1, and a container 2 storing the electrode group 1 and the nonaqueous electrolyte.

The electrode group 1 includes a negative electrode 3, a separator 4, and a positive electrode 5, as shown in FIG. 3.

The negative electrode 3 has the same structure as that of the negative electrode 3 described with reference to FIG. 1. Specifically, the negative electrode 3 contains a negative electrode current collector 3a and a negative electrode layer 3b formed on the negative electrode current collector 3a. The negative electrode layer 3b contains a titanium composite oxide and a carboxymethyl-cellulose compound. In the battery 10 shown in FIGS. 2 and 3, the negative electrode 3 is positioned on the outermost periphery of the wound type electrode group 1. The portion of the negative electrode 3 positioned on the outermost periphery is provided with the negative electrode layer 3b only on one surface, which directs to the core of the electrode group, of the negative electrode current collector 3a. Another portion of the negative electrode 3 is provided with the negative electrode layer 3b on each side of the negative electrode current collector 3a.

The positive electrode 5 contains a positive electrode current collector 5a and a positive electrode layer 5b formed on each side of the positive electrode current collector 5a. The positive electrode layer 5b contains a positive electrode active material.

The separator 4 is positioned between a negative electrode layer 4b and the positive electrode layer 5b.

The electrode group 1 is formed by spirally winding a laminated product obtained by laminating the negative electrode 3, the separator 4, the positive electrode 5, and the separator 4 in this order, and press molding the resultant product.

As shown in FIG. 2, a band-shaped negative electrode terminal 6 is connected to the negative electrode current collector 3a on the outermost periphery of the wound type electrode group 1. A band-shaped positive electrode terminal 7 is connected to the positive electrode current collector 5a in the vicinity of the outer peripheral end of the wound type electrode group 1. The negative electrode terminal 6 and the positive electrode terminal 7 are extended outwardly through an opening of the container 2.

The container 2 is a baggy container made of a laminate film. The nonaqueous electrolyte is injected into the container 2 through an inlet formed in the container 2. The opening of the container 2 is heat-sealed in a state that the negative electrode terminal 6 and the positive electrode terminal 7 are sandwiched, thereby the wound type electrode group 1 and the nonaqueous electrolyte are completely sealed.

According to the second embodiment described above, the nonaqueous electrolyte battery is provided. The nonaqueous electrolyte battery includes the negative electrode according to the first embodiment, the positive electrode, and the nonaqueous electrolyte. Since the nonaqueous electrolyte battery according to the second embodiment includes the negative electrode according to the first embodiment, the nonaqueous electrolyte battery can exhibit an excellent cycle life.

(Third Embodiment)

According to a third embodiment, there is provided a battery pack. The battery pack includes the nonaqueous electrolyte battery according to the second embodiment. The nonaqueous electrolyte battery can exhibit an excellent cycle life, as described in the description of the second embodiment. Therefore, the battery pack according to the third embodiment can exhibit an excellent cycle life.

The battery pack according to the third embodiment may include a nonaqueous electrolyte battery according to the second embodiment, and may include a plurality of nonaqueous electrolyte batteries. The battery pack according to the third embodiment can include an energizing terminal to an external instrument.

Next, the battery pack of an example according to the third embodiment will be described more in detail with reference to the drawings.

Figure 5:
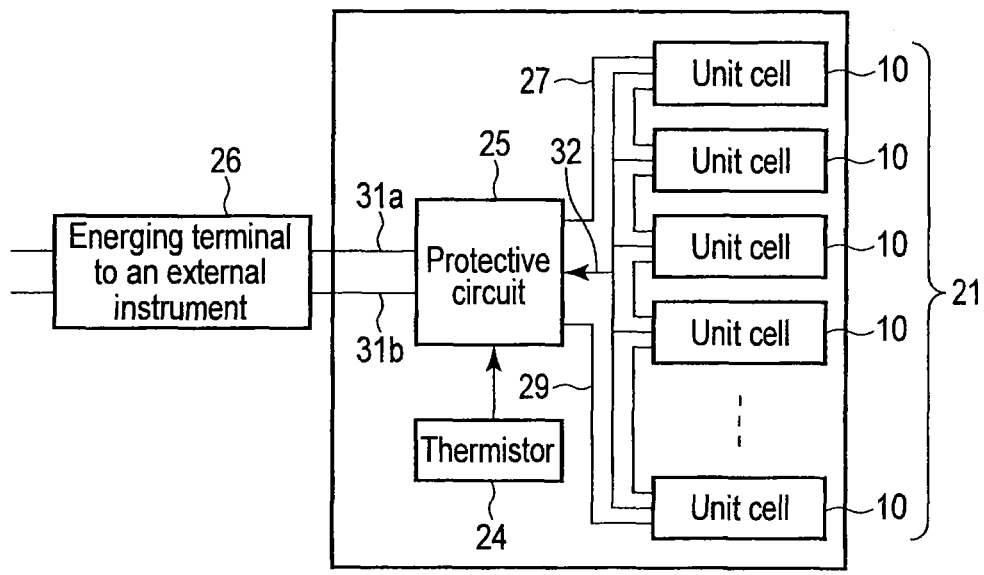
FIG. 5 is a block diagram showing an electric circuit of a battery pack shown in FIG. 4.

FIG. 4 is an exploded perspective view of the battery pack of an example according to the third embodiment. FIG. 5 is a block diagram showing an electric circuit of the battery pack shown in FIG. 4.

A battery pack 100 shown in FIGS. 4 and 5 includes a plurality of batteries (unit cell) 10 according to the first embodiment. The battery 10 includes a negative electrode terminal 6 and a positive electrode terminal 7 which project in the same direction. The plurality of batteries 10 are laminated in a state where the projection of the negative electrode terminal 6 and the projection of the positive electrode terminal 7 are aligned to one direction. As shown in FIGS. 4 and 5, the plurality of batteries 10 are connected in series, to thus form a battery module 21. As shown in FIG. 4, the battery module 21 is integrated into a single unit by an adhesive tape 22.

A printed wiring board 23 is disposed along a side surface of the battery pack where the projection of the negative electrode terminal 6 and the projection of the positive electrode terminal 7 are provided. As shown in FIG. 5, a thermistor 24, a protective circuit 25, and an energizing terminal 26 to an external instrument are implemented on the printed wiring board 23.

As shown in FIGS. 4 and 5, a positive electrode wiring 27 of the battery module 21 is electrically connected to a positive electrode connector 28 of the protective circuit 25 of the printed wiring board 23. A negative electrode wiring 29 of the battery module 21 is electrically connected to a negative electrode connector 30 of the protective circuit 25 of the printed wiring board 23.

The thermistor 24 detects the temperature of the unit cell 10. A detection signal for the temperature of the unit cell 10 is transmitted to the protective circuit 25 from the thermistor 24. The protective circuit 25 can shut down a plus-side wiring 31a and a minus-side wiring 31b between the protective circuit and the energizing terminal to an external instrument under a predetermined condition. The predetermined condition includes the case where a temperature detected by the thermistor 24 reaches a predetermined temperature or more, and the excessive charge, discharge or current of the battery 10, or the like is detected. This detection method is applied to the respective batteries 10 or the entirety of the battery module 21. When each of the batteries 10 is detected, detection of a battery voltage or detection of the positive electrode voltage or the negative electrode voltage may also be performed. A lithium electrode used as a reference electrode is inserted into each of the batteries 10, and thereby the entirety of the battery module 21 can be detected. In the case shown in FIG. 5, wires 32 for use in detecting a voltage are connected to the respective batteries 10, and a detection signal is transmitted to the protective circuit 25 by way of these wires 32.

Three side surfaces of the battery module 21 exclusive of the side surface from which the negative electrode terminals 6 and the positive electrode terminals 7 project are provided with respective protective sheets 33 formed from rubber or a resin. The protective block 34 formed from rubber or resin is interposed between the side surface from which the negative electrode terminals 6 and the positive electrode terminals 7 project and the printed wiring board 23.

This battery module 21 is stored in a storage container 35 along with the respective protective sheets 33, the protective block 34, and the printed wiring board 23. Specifically, the protective sheet 33 is disposed on both inside surfaces in the direction of the long side and on one of the inside surfaces in the direction of the short side of the storage container 35, and the printed wiring board 24 is disposed on the other inside surface in the direction of the short side. The battery module 21 is placed in a space enclosed by the protective sheet 33 and the printed wiring board 24. A lid 36 is attached to the upper surface of the storage container 35.

A heat shrinkable tape may be used in place of the adhesive tape 22 to secure the battery module 21. In this case, after the protective sheet is disposed on both of surfaces of the battery module and the heat shrinkable tape is wound around the battery module, the heat shrinkable tape is shrunken by heating to fasten the battery module.

The batteries 10 shown in FIGS. 4 and 5 are connected in series. However, the batteries 10 can also be connected in parallel to increase the capacity of the battery pack. Of course, the assembled battery packs can be connected in series or in parallel.

The form of the battery pack can be appropriately changed according to the use.

As the application of the battery pack according to the third embodiment, the application in which an excellent cycle characteristics in high current is required is preferred. Specifically, the application of the battery pack as a power source for digital cameras, for vehicles such as two- or four-wheel hybrid electric vehicles, two- or four-wheel electric vehicles, and assisted bicycles or the like are included. Particularly, the automobile application is preferred.

According to the third embodiment described above, the battery pack is provided. The battery pack includes the nonaqueous electrolyte battery according to the second embodiment. Since the battery pack according to the third embodiment includes the nonaqueous electrolyte battery according to the second embodiment, the battery pack can exhibit an excellent cycle life.

EXAMPLES

Hereinafter, the present invention will be described more in detail referring to the examples. However, the present invention is not limited to the following examples without departing from the spirit of the present invention.

Fabrication Example 1

In fabrication example 1, a negative electrode having the same structure as that of a negative electrode shown in FIG. 1 was produced according to a procedure described below.

First, a powder of a monoclinic system β-type titanium composite oxide ($TiO_2$ (B)) and acetylene black were mixed in an aqueous solution of a sodium salt of carboxymethyl-cellulose, to obtain a mixture. A styrene-butadiene copolymer rubber particle aqueous solution (AY9074 manufactured by Zeon Corporation) was added to the mixture, and the mixture was mixed, to prepare a negative electrode production slurry. In this case, the powder of the monoclinic system β-type titanium composite oxide, the acetylene black, the sodium salt of the carboxymethyl-cellulose, and the styrene-butadiene copolymer rubber were formulated in ratios of 91 parts by mass, 5 parts by mass, 2 parts by mass, and 2 parts by mass, respectively.

The powder of the monoclinic system β-type titanium composite oxide had an average primary particle diameter of 1 μm or less and an average coagulated particle (secondary particle) diameter of about 10 μm. The particle diameter of a negative electrode active material was measured using a laser diffraction and scattering particle size analyzer (Microtrack MT3000 manufactured by Nikkiso Co., Ltd.). The specific surface area of the powder of the monoclinic system β-type titanium composite oxide measured by the BET adsorption method by $N_2$ adsorption was 16.9 $m^2/g$. The degree of etherification of the sodium salt of the carboxymethyl-cellulose measured by a incineration measuring method was 1.38.

The prepared negative electrode production slurry was applied onto both of surfaces of negative electrode current collectors 3a formed from an aluminum foil in a state where unapplied parts were partially left. The negative electrode current collectors 3a onto each of which the slurry was applied was dried. The negative electrode current collectors 3a were pressed at various linear pressures to produce a plurality of negative electrodes 3 in which negative electrode layers 3b had different densities.

The density of the negative electrode layer 3b was calculated by measuring an electrode weight and an electrode film thickness and deducting the weight and thickness of the negative electrode current collector.

Figure 6:
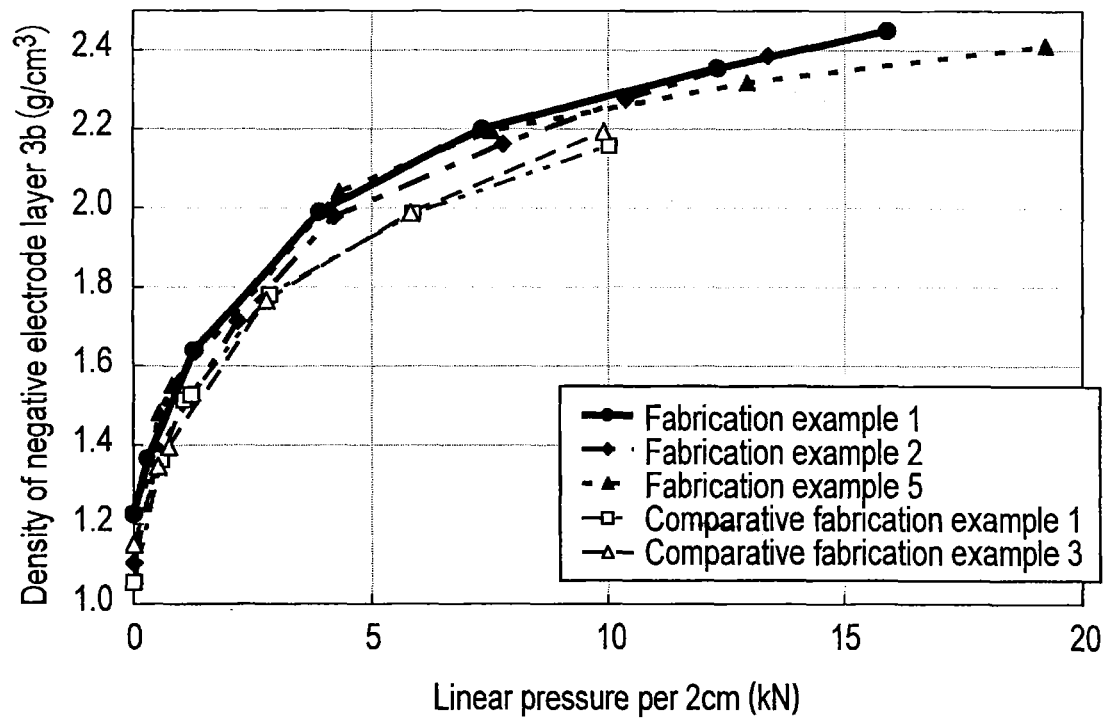
FIG. 6 is a graph obtained by plotting a change in a density of a negative electrode layer according to a press pressure in fabrication example 1, fabrication example 2, fabrication example 5, comparative fabrication example 1, and a comparative fabrication example 3.

A graph obtained by plotting a variation in a density of the negative electrode layer 3b of the negative electrode 3 produced in fabrication example 1 according to a press pressure applied is shown in FIG. 6.

The result of FIG. 6 showed that in the negative electrodes 3 produced in fabrication example 1, the negative electrode layer 3b could have a density of 2.2 $g/cm^3$ by a press at a linear pressure of 7.3 kN per 2 cm without causing the peeling of the negative electrode layer 3b from the negative electrode current collector 3a. The result of FIG. 6 also showed that in the negative electrodes 3 produced in fabrication example 1, the negative electrode layer 3b could have a density of more than 2.2 $g/cm^3$ by a press at a linear pressure of more than 7.3 kN per 2 cm without causing the peeling of the negative electrode layer 3b from the negative electrode current collector 3a.

Using the negative electrodes containing the negative electrode layer 3b having a density of 2.2 $g/cm^3$ or more among the negative electrodes 3 produced in fabrication example 1, a bending test was made to evaluate the adhesion between the negative electrode layer 3b and the negative electrode current collector 3a. The bending test was made using a cylinder type mandrel bending tester (manufactured by COTEC Corporation). In the bending test, each of the negative electrodes 3 was wound around a 3-mm-diameter rod at a winding angle of 180 degrees to confirm cracks in the negative electrode layer 3b and peeling of the negative electrode layer 3b from the negative electrode current collector 3a. As a result, neither cracks nor peeling were observed.

Fabrication Example 2

In this example, a plurality of negative electrodes 3 containing negative electrode layers 3b having different densities were produced by the same method as that of fabrication example 1 except that a powder of a monoclinic system β-type titanium composite oxide having a surface subjected to neutralization treatment by NaOH was used, and the powder of the monoclinic system β-type titanium composite oxide, acetylene black, a sodium salt of carboxymethyl-cellulose, and styrene-butadiene copolymer rubber were formulated in ratios of 92 parts by mass, 3 parts by mass, 2 parts by mass, and 2 parts by mass, respectively, to prepare a negative electrode production slurry.

The monoclinic system β-type titanium composite oxide powder used had an average primary particle diameter of 1 μm or less and an average coagulated particle (secondary particle) diameter of about 10 μm. The specific surface area of the powder of the monoclinic system β-type titanium composite oxide measured by the BET adsorption method by $N_2$ adsorption was 16.8 $m^2/g$.

A graph obtained by plotting a variation in a density of the negative electrode layer 3b of the negative electrode 3 produced in fabrication example 2 according to a press pressure is shown in FIG. 6.

The result of FIG. 6 showed that in the negative electrodes 3 produced in fabrication example 2, the negative electrode layer 3b could have a density of 2.2 $g/cm^3$ by a press at a linear pressure of 8.5 kN per 2 cm without causing the peeling of the negative electrode layer 3b from the negative electrode current collector 3a. The result of FIG. 6 also showed that in the negative electrodes 3 produced in fabrication example 2, the negative electrode layer 3b could have a density of more than 2.2 $g/cm^3$ by a press at a linear pressure of more than 8.5 kN per 2 cm without causing the peeling of the negative electrode layer 3b from the negative electrode current collector 3a.

Using the negative electrodes containing the negative electrode layer 3b having a density of 2.2 $g/cm^3$ or more among the negative electrodes 3 produced in fabrication example 2, a bending test was made in the same manner as in fabrication example 1 to evaluate the adhesion between the negative electrode layer 3b and the negative electrode current collector 3a. As a result, neither cracks nor peeling were observed.

Fabrication Example 3

A plurality of negative electrodes 3 having different densities were produced by the same method as that of fabrication example 1 except that a sodium salt of carboxymethyl-cellulose having a degree of etherification of 1.60 measured by a incineration measuring method was used. In this fabrication example 3, a negative electrode layer 3b having a density of 2.2 $g/cm^3$ could be obtained by a press at a linear pressure of 6.9 kN per 2 cm.

Using the negative electrodes containing the negative electrode layer 3b having a density of 2.2 $g/cm^3$ or more among the negative electrodes 3 produced in fabrication example 3, a bending test was made in the same manner as in fabrication example 1 to evaluate the adhesion between the negative electrode layer 3b and the negative electrode current collector 3a. As a result, neither cracks nor peeling were observed.

Fabrication Example 4

A plurality of negative electrodes 3 containing negative electrode layers 3b having different densities were produced by the same method as that of fabrication example 1 except that a powder of a lithium titanate ($Li_4Ti_5O_{12}$) having a spinel structure was used in place of a powder of a monoclinic system β-type titanium composite oxide, and graphite (KS6 manufactured by TIMCAL) was used in place of acetylene black.

The powder particles of the lithium titanate having a spinel structure had an average particle diameter of about 1 μm. The specific surface area of the lithium titanate powder measured by the BET adsorption method by $N_2$ adsorption was 3.2 $m^2/g$.

In a negative electrode production slurry, the powder of the lithium titanate having a spinel structure, graphite, a sodium salt of carboxymethyl-cellulose, and styrene-butadiene copolymer rubber were formulated in ratios of 93 parts by mass, 4 parts by mass, 2 parts by mass, and 1 part by mass, respectively.

In this fabrication example 4, a negative electrode layer 3b having a density of 2.2 g/cm³ could be obtained by a press at a linear pressure of 7.6 kN per 2 cm.

Using the negative electrodes containing the negative electrode layer 3b having a density of 2.2 g/cm² or more among the negative electrodes 3 produced in fabrication example 4, a bending test was made in the same manner as in fabrication example 1 to evaluate the adhesion between the negative electrode layer 3b and the negative electrode current collector 3a. As a result, neither cracks nor peeling were observed.

Fabrication Example 5

A plurality of negative electrodes 3 containing negative electrode layers 3b having different densities were produced by the same method as that of fabrication example 1 except that a powder of a lithium titanate ($Li_4Ti_5O_{12}$) having a spinel structure was used in addition to a powder of a monoclinic system b-type titanium composite oxide, and graphite (KS6 manufactured by TIMCAL) was used in place of acetylene black.

The same lithium titanate having a spinel structure as that used in fabrication example 4 was used as the lithium titanate having a spinel structure.

The powder of the monoclinic system β-type titanium composite oxide, the powder of the lithium titanate having a spinel structure, the graphite, a sodium salt of carboxymethyl-cellulose, and styrene-butadiene copolymer rubber were formulated in ratios of 73 parts by mass, 18 parts by mass, 5 parts by mass, 2 parts by mass, and 2 parts by mass, respectively, to prepare a negative electrode production slurry.

A graph obtained by plotting a variation in a density of the negative electrode layer 3b of the negative electrode 3 produced in fabrication example 5 according to a press pressure is shown in FIG. 6.

The result of FIG. 6 showed that in the negative electrodes 3 produced in fabrication example 5, the negative electrode layer 3b could have a density of 2.2 g/cm³ by a press at a linear pressure of 7.5 kN per 2 cm without causing the peeling of the negative electrode layer 3b from the negative electrode current collector 3a. The result of FIG. 6 also showed that in the negative electrodes 3 produced in fabrication example 5, the negative electrode layer 3b could have a density of more than 2.2 g/cm³ by a press at a linear pressure of more than 7.5 kN per 2 cm without causing the peeling of the negative electrode layer 3b from the negative electrode current collector 3a.

Using the negative electrodes containing the negative electrode layer 3b having a density of 2.2 g/cm³ or more among the negative electrodes 3 produced in fabrication example 5, a bending test was made in the same manner as in fabrication example 1 to evaluate the adhesion between the negative electrode layer 3b and the negative electrode current collector 3a. As a result, neither cracks nor peeling were observed.

Comparative Fabrication Example 1

A plurality of negative electrodes 3 having different densities were produced by the same method as that of fabrication example 1 except that a sodium salt of carboxymethyl-cellulose having a degree of etherification of 0.70 measured by a incineration measuring was used.

A graph obtained by plotting a variation in a density of the negative electrode layer 3b of the negative electrode 3 produced in comparative fabrication example 1 according to a press pressure is shown in FIG. 6. In this comparative fabrication example 1, the negative electrode layer 3b having a density of 2.2 g/cm³ could be obtained by a press at a linear pressure of 11.8 kN per 2 cm. However, a plot representing a density of 2.2 g/cm³ is not shown in FIG. 6. This is because the negative electrode layer 3b having a density of 2.2 g/cm³ is peeled from the negative electrode current collector 3a by a press in this comparative fabrication example 1, and the negative electrode cannot be obtained.

Comparative Fabrication Example 2

A plurality of negative electrodes 3 having different densities were produced by the same method as that of fabrication example 1 except that a sodium salt of carboxymethyl-cellulose having a degree of etherification of 0.90 measured by a incineration measuring method was used. In this comparative fabrication example 1, a negative electrode layer 3b having a density of 2.2 g/cm³ could be obtained by a press at a linear pressure of 11.4 kN per 2 cm. However, in this comparative fabrication example 2, the negative electrode layer 3b having a density of 2.2 g/cm³ was peeled from the negative electrode current collector 3a by a press, and the negative electrode could not be obtained.

Comparative Fabrication Example 3

A plurality of negative electrodes 3 having different densities were produced by the same method as that of fabrication example 1 except that polyvinylidene fluoride (PVDF) having an average molecular weight of $4\times10^5$ was used in place of a sodium salt of carboxymethyl-cellulose; styrene-butadiene copolymer rubber was not used; and N-methylpyrrolidone was used as a solvent used to prepare a negative electrode production slurry.

A powder of a monoclinic system β-type titanium composite oxide, acetylene black, and polyvinylidene fluoride were formulated in ratios of 92 parts by mass, 2.5 parts by mass, and 2.5 parts by mass, respectively, to prepare a negative electrode production slurry.

A graph obtained by plotting a variation in a density of the negative electrode layer 3b of the negative electrode 3 produced in comparative fabrication example 3 according to a press pressure is shown in FIG. 6. In this comparative fabrication example 3, the negative electrode layer 3b having a density of 2.2 g/cm³ could be obtained by a press at a linear pressure of 10.0 kN per 2 cm. However, a plot representing a density of 2.2 g/cm³ is not shown in FIG. 6. This is because the negative electrode layer 3b having a density of 2.2 g/cm³ is peeled from the negative electrode current collector 3a by a press in this comparative fabrication example 3 and the negative electrode cannot be obtained.

Comparative Fabrication Example 4

A plurality of negative electrodes 3 having different densities were produced by the same method as that of fabrication example 1 except that graphite (KS6 manufactured by TIMCAL) was used in place of a powder of a monoclinic system β-type titanium composite oxide, and acetylene black was not used.

Graphite, a sodium salt of carboxymethyl-cellulose, and styrene-butadiene copolymer rubber were formulated in ratios of 98 parts by mass, 1 part by mass, and 1 part by mass, respectively, to prepare a negative electrode production slurry.

In comparative fabrication example 4, the density of the negative electrode layer 3b could not be designed to be 2.2 g/cm$^3$ or more, and could be designed to be 1.7 g/cm$^3$ at a maximum. In the negative electrode containing the negative electrode layer 3b having a density of 1.7 g/cm$^3$, the negative electrode layer 3b was peeled from the negative electrode current collector 3a by a press.

(Evaluation)

The degree of etherification of CMC, the linear pressure capable of designing the density of the negative electrode layer 3b to be 2.2 g/cm$^3$, and the existence or non-existence of peeling of the negative electrode layer in fabrication examples 1 to 5 and comparative fabrication examples 1 and 2 are shown in the following Table 1. The results of Comparative fabrication examples 3 and 4 are also collectively shown for reference in the following Table 1.

pressure. Even if the negative electrodes 3 produced in fabrication examples 1 to 5 were subjected to the bending test, neither cracks nor peeling were observed. This is because the carboxymethyl-cellulose compound has high flexibility and excellent bindability to the titanium composite oxide.

In comparative fabrication examples 1 and 2, the carboxymethyl-cellulose compound having a degree of etherification of less than 1 was used. As shown in the Table 1, in comparative fabrication examples 1 and 2 using the carboxymethyl-cellulose compound having a degree of etherification of less than 1, a press pressure required for designing the density of the negative electrode layer 3b to be 2.2 g/cm$^3$ was higher than that in fabrication examples 1 to 3 using the carboxymethyl-cellulose compound having a degree of etherification of 1 or more and 2 or less. Therefore, when the density of the negative electrode layer 3b was designed to be 2.2 g/cm$^3$ by a high pressure press in comparative fabrication examples 1 and 2, the negative electrode layer 3b was peeled from the negative electrode current collector 3a. The reason for this is considered to be because the negative electrode production slurries prepared in comparative fabrication examples 1 and 2 using the

TABLE 1

| | Negative electrode active material | CMC | Degree of Etherification of CMC | Linear Pressure capable of Designing density of Negative electrode material layer 3b to be 2.2 g/cm$^3$ (kN/2 cm) | Peeling of Negative electrode material layer 3b |
|---|---|---|---|---|---|
| Fabrication Example 1 | Monoclinic system β-type titanium composite oxide | Contained | 1.38 | 7.3 | Not observed |
| Fabrication Example 2 | Monoclinic system β-type titanium (having a surface neutralized by NaOH) | Contained | 1.38 | 8.5 | Not observed |
| Fabrication Example 3 | Monoclinic system β-type titanium composite oxide | Contained | 1.6 | 6.9 | Not observed |
| Fabrication Example 4 | Lithium titanate having spinel structure | Contained | 1.38 | 7.6 | Not observed |
| Fabrication Example 5 | Monoclinic system β-type titanium + Lithium titanate having spinel structure (Mixing ratio 73:18) | Contained | 1.38 | 7.5 | Not observed |
| Comparative Fabrication Example 1 | Monoclinic system β-type titanium composite oxide | Contained | 0.7 | 11.8 | Observed |
| Comparative Fabrication Example 2 | Monoclinic system β-type titanium composite oxide | Contained | 0.9 | 11.4 | Observed |
| Comparative Fabrication Example 3 | Monoclinic system β-type titanium composite oxide | Absence | — | Not fabricated | Observed |
| Comparative Fabrication Example 4 | Graphite | Contained | 1.38 | Not fabricated | Observed |

As apparent from the results of fabrication examples 1 to 5 shown in Table 1, in fabrication examples 1 to 5 in which the negative electrode production slurry containing the titanium composite oxide and the carboxymethyl-cellulose compound having a degree of etherification of 1 or more and 2 or less were prepared, the density of the negative electrode layer 3b could be designed to be 2.2 g/cm$^3$ by pressing the negative electrode layer 3b at a linear pressure of 8.5 kN or less per 2 cm without causing the peeling of the negative electrode layer 3b from the negative electrode current collector 3a. This is because the carboxymethyl-cellulose compound having a degree of etherification of 1 or more and 2 or less has high flexibility and therefore, can attain the high density of the negative electrode layer 3b even at a low carboxymethyl-cellulose compound having a degree of etherification of less than 1 have lower flexibility than those of the negative electrode production slurries prepared in fabrication examples 1 to 5, which requires a high pressure in order to attain the high density of the negative electrode layer 3b. Another reason for the peeling is considered to be because the bindability between the carboxymethyl-cellulose compound having a degree of etherification of less than 1 and the titanium composite oxide is lower than the bindability between the carboxymethyl-cellulose compound having a degree of etherification of 1 or more and 2 or less and the titanium composite oxide.

A press pressure required for designing the density of the negative electrode layer 3b to be 2.2 g/cm$^3$ in comparative fabrication example 3 using the polyvinylidene fluoride in place of the carboxymethyl-cellulose compound was higher than those in fabrication examples 1 to 5 using the carboxymethyl-cellulose compound having a degree of etherification of 1 or more and 2 or less. Therefore, when the density of the negative electrode layer 3b was designed to be 2.2 g/cm$^3$ by a high pressure press in comparative fabrication example 3, the negative electrode layer 3b was peeled from the negative electrode current collector 3a. This reason for this is considered to be because the negative electrode production slurries prepared in comparative fabrication example 3 using the polyvinylidene fluoride have lower flexibility than those of the negative electrode production slurries prepared in fabrication examples 1 to 5, which require a high pressure in order to attain the high density of the negative electrode layer 3b. Another reason for the peeling is considered to be because the bindability between the polyvinylidene fluoride and the titanium composite oxide is lower than the bindability between the carboxymethyl-cellulose compound having a degree of etherification of 1 or more and 2 or less and the titanium composite oxide. Therefore, it is considered that the negative electrode layer 3b is peeled from the negative electrode current collector 3a by a high pressure press in comparative fabrication example 3.

The carboxymethyl-cellulose compound having a degree of etherification of 1.38 was used in comparative fabrication example 4 using the graphite in place of the powder of the monoclinic system β-type titanium composite oxide. However, the density of the negative electrode layer 3b was not designed to be 2.2 g/cm$^3$. This shows that the graphite cannot independently attain the density of 2.2 g/cm$^3$ or more.

When the density of the negative electrode layer 3b was designed to be 1.7 g/cm$^3$ by a press in comparative fabrication example 4, the negative electrode layer 3b was peeled from the negative electrode current collector 3a. The reason for this is considered to be because the bindability between the carboxymethyl-cellulose compound having a degree of etherification of 1.38 and the graphite is poor.

Example 1

An evaluation cell was produced according to the following procedure using the negative electrode 3 containing the negative electrode layer 3b having a density of 2.3 g/cm$^3$ among the plurality of negative electrodes 3 produced in fabrication example 1. The negative electrode 3 containing the negative electrode layer 3b having a density of 2.3 g/cm$^3$ was obtained by a press at a linear pressure of 10.5 kN per 2 cm.

First, under a dry argon atmosphere, the above negative electrode 3 (20 mm×20 mm square) as a working electrode and metallic lithium as a counter electrode were made to face each other with a glass filter as a separator sandwiched therebetween, and put into a three-pole glass cell. Furthermore, metallic lithium as a reference electrode was inserted into the three-pole glass cell in such a manner as not to be in contact with the working electrode and the counter electrode.

Then, each of the working electrode, the counter electrode, and the reference electrode was connected with a terminal of the glass cell. Then, an electrolyte solution was poured into the glass cell and the glass cell was closed in a state where the separator, the working electrode, the counter electrode, and the reference electrode were sufficiently impregnated with the electrolyte solution, to produce an evaluation cell of Example 1. A mixture solvent prepared by mixing ethylene carbonate (EC) with diethyl carbonate (DEC) in a ratio by volume of 1:2 was used as a solvent of the electrolyte solution. LiPF$_6$ was used as the electrolyte of the electrolyte solution. The concentration of the electrolyte in the electrolyte solution was designed to be 1.0 mol/L.

Figure 7:
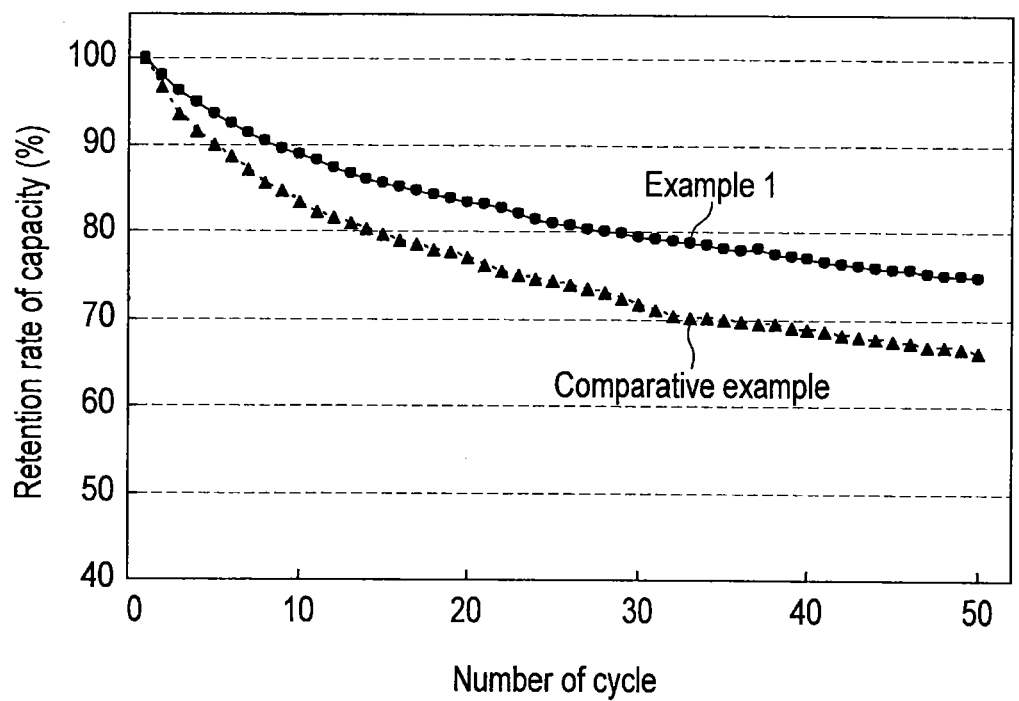
FIG. 7 is a graph showing results of cycle life characteristic tests of Example 1 and Comparative Example.

The evaluation cell thus produced was subjected to an acceleration test of charge/discharge cycle life in an environment of 45° C. A charge/discharge rate was designed to be 1 C. A voltage range was designed to be 1.4 to 3.0 V (vs. Li/Li$^+$). The result of the charge/discharge test is shown in FIG. 7. A retention rate of a capacity after 50 cycles for Example 1 was 75%, and was more than 70%.

The charge/discharge test was performed in an environment of 25° C. and a charge/discharge rate of 0.2 C using the evaluation cell produced as described above. The result showed that a first cycle discharge capacity per weight of the negative electrode active material for Example 1 was 195 mAh/g.

Comparative Example

An evaluation cell was produced by the same method as that of Example 1 except that the negative electrode 3 containing the negative electrode layer 3b having a density of 2.17 g/cm$^3$ was used among the plurality of negative electrodes 3 produced in fabrication example 1. The negative electrode 3 containing the negative electrode layer 3b having a density of 2.17 g/cm$^3$ was obtained by a press at a linear pressure of 7.0 kN per 2 cm.

The evaluation cell thus produced was subjected to an acceleration test of charge/discharge cycle life by the same method as that of Example 1. The result of the charge/discharge test is shown in FIG. 7. A retention rate of a capacity after 50 cycles for Comparative Example was 66%, and was less than 70%.

The degree of etherification of CMC, the density of the negative electrode layer 3b, and the retention rate of the capacity after 50 cycles in Example 1 and Comparative Example are newly shown in the following Table 2.

TABLE 2

| | Degree of Etherification of CMC | Density of Negative electrode material layer 3b (g/cm$^3$) | Retention rate after 50 Cycles (%) |
|---|---|---|---|
| Example 1 | 1.38 | 2.3 | 75 |
| Comparative Example | 1.38 | 2.17 | 66 |

When the results of Example 1 shown in Table 2 and FIG. 7 were compared with the result of Comparative Example, it was found that Example 1 using the negative electrode 3 containing the negative electrode layer 3b having a density of 2.3 g/cm$^3$ had a more excellent cycle life than that of Comparative Example using the negative electrode 3 containing the negative electrode layer 3b having a density of 2.17 g/cm$^3$. One of the reasons for such is considered to be because Example 1 has a higher density and lower internal resistance than those of the comparative example. Furthermore, the negative electrode 3 used in Example 1 was produced by a press at a linear pressure of 10.5 kN per 2 cm so that the adhesion between the negative electrode current collector 3a and the negative electrode layer 3b can be kept. Therefore, the negative electrode 3 used in Example 1 has a high cohesive strength. Another reason why the evaluation cell of Example 1 exhibits an excellent cycle life is considered to be the high cohesive strength of the negative electrode 3 of the evaluation cell of Example 1.

Example 2

An evaluation cell was produced by the same method as that of Example 1 except that the negative electrode 3 containing the negative electrode layer 3b having a density of 2.3 g/cm$^3$ was used among the plurality of negative electrodes 3 produced in fabrication example 4. The negative electrode 3 containing the negative electrode layer 3b having a density of 2.3 g/cm$^3$ was obtained by a press at a linear pressure of 12.4 kN per 2 cm.

A charge/discharge test was performed by the same method as that of Example 1 in an environment of 25° C. and a charge/discharge rate of 0.2 C for Example 2 using the evaluation cell thus produced. The result showed that the first cycle discharge capacity per weight of the negative electrode active material for Example 2 was 146 mAh/g.

Example 3

An evaluation cell was produced by the same method as that of Example 1 except that the negative electrode 3 containing the negative electrode layer 3b having a density of 2.3 g/cm$^3$ was used among the plurality of negative electrodes 3 produced in fabrication example 5. The negative electrode 3 containing the negative electrode layer 3b having a density of 2.3 g/cm$^3$ was obtained by a press at a linear pressure of 12.1 kN per 2 cm.

A charge/discharge test was performed by the same method as that of Example 1 in an environment of 25° C. and a charge/discharge rate of 0.2 C for Example 3 using the evaluation cell thus produced. The result showed that the first cycle discharge capacity per weight of the negative electrode active material for Example 3 was 186 mAh/g.

The negative electrode active material contained in the negative electrode layer 3b and the first cycle discharge amount per weight of the negative electrode active material in Examples 1 to 3 are newly shown in the following Table 3.

TABLE 3

| | Negative electrode active material | Initial Discharge capacity per weight of Negative material active material (mAh/g) |
|---|---|---|
| Example 1 | Monoclinic system β-type titanium composite oxide | 195 |
| Example 2 | Lithium titanate having spinel structure | 146 |
| Example 3 | Monoclinic system β-type titanium composite oxide + Lithium titanate having spinel structure (Mixing ratio 73:18) | 186 |

The results of the charge/discharge tests in an environment of 25° C. and a charge/discharge rate of 0.2 C of Examples 1 and 2 shown in Table 3 show that Example 1 using the powder of the monoclinic system β-type titanium composite oxide as the titanium composite oxide exhibits a higher first cycle discharge capacity than that of Example 2 using the powder of the lithium titanate having a spinel structure as the titanium composite oxide.

The results of the charge/discharge tests in an environment of 25° C. and a charge/discharge rate of 0.2 C of Examples 1 to 3 shown in Table 3 show that a higher first cycle discharge capacity is exhibited as the weight rate of the monoclinic system β-type titanium composite oxide in the titanium composite oxide is higher.

The result of the charge/discharge test of Example 3 in an environment of 25° C. and a charge/discharge rate of 0.2 C shows that an excellent first cycle discharge capacity per weight of the negative electrode active material of 186 mAh/g is exhibited when the negative electrode production slurry in which a ratio of the monoclinic system β-type titanium composite oxide to the lithium titanate having a spinel structure is 73:18 is used.

Thus, when the threshold value of the cycle life is set as the minimum discharge capacity, the battery capable of exhibiting high first cycle discharge capacity can lengthen a time until the discharge capacity reaches the threshold value.

According to at least one embodiment and example described above, the negative electrode is provided. The negative electrode contains the negative electrode layer. The negative electrode layer contains the titanium composite oxide and the carboxymethyl-cellulose compound. The carboxymethyl-cellulose compound has a degree of etherification of 1 or more and 2 or less. The negative electrode layer has a density of 2.2 g/cm$^3$ or more.

Because of this, the negative electrode layer can have a density of 2.2 g/cm$^3$ or more without causing cracks and peeling, due to the low press pressure. The negative electrode can exhibit a high cohesive strength, and can reduce internal resistance. Consequently, the negative capable of exhibiting an excellent cycle life.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A negative electrode, comprising:
  a negative electrode layer comprising
    secondary particles of a titanium oxide component selected from the group consisting of a titanium composite oxide, comprising a monoclinic system β-type TiO$_2$, and a mixture thereof,
    a carboxymethyl-cellulose compound having a degree of etherification of 1 or more and 2 or less, and
    a styrene-butadiene copolymer rubber,
    wherein a content of the styrene-butadiene copolymer rubber is from 1% by mass to 8% by mass based on the titanium oxide component,
    wherein an amount of the monoclinic s stem β-type TiO$_2$ is not less than 80% by weight based on a weight of the titanium oxide component, and
    wherein the negative electrode layer has a density of 2.2 g/cm$^3$ or more.

2. The negative electrode according to claim 1, wherein monoclinic system p-type TiO, has a specific surface of no less than 5 m$^2$/g and no more than 50 m$^2$/g.

3. A nonaqueous electrolyte battery comprising:
  the negative electrode according to claim 1;
  a positive electrode; and
  a nonaqueous electrolyte.

4. A battery pack comprising the nonaqueous electrolyte battery according to claim 3.

5. The battery pack according to claim 4, comprising a plurality of the nonaqueous electrolyte batteries.

6. The battery pack according to claim 5, wherein the plurality of the nonaqueous electrolyte batteries are electrically connected to each other in series, in parallel or in the combination thereof.

7. The battery pack according to claim 4, further comprising:
   a protective circuit configured to detect a voltage of the nonaqueous electrolyte battery.

8. The negative electrode according to claim 1, wherein a content of the styrene-butadiene copolymer rubber is from 2.2% by mass to 8% by mass based on the titanium oxide component.

9. The negative electrode according to claim 1, wherein the secondary particles consists of the monoclinic system β-type $TiO_2$.

10. The negative electrode according to claim 9, wherein the secondary particles have an average secondary particle diameter in a range from 5 μm to 20 μm.

11. The negative electrode according to claim 1, wherein the secondary particles consist of further comprise lithium titanate having a spinel structure.

* * * * *